Dec. 11, 1928.
L. M. SPENCER ET AL
1,694,871
HEAT INDICATOR FOR INTERNAL COMBUSTION ENGINES
Filed July 23, 1927
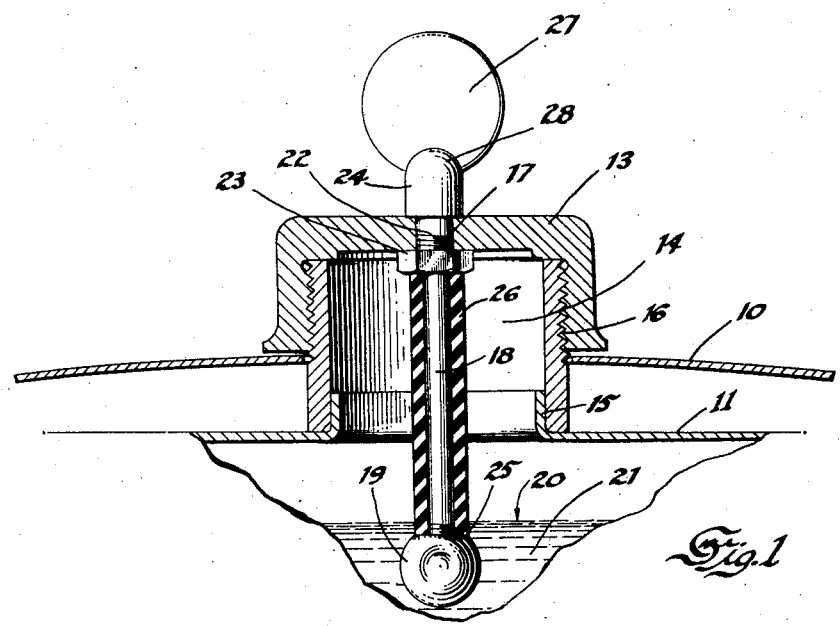
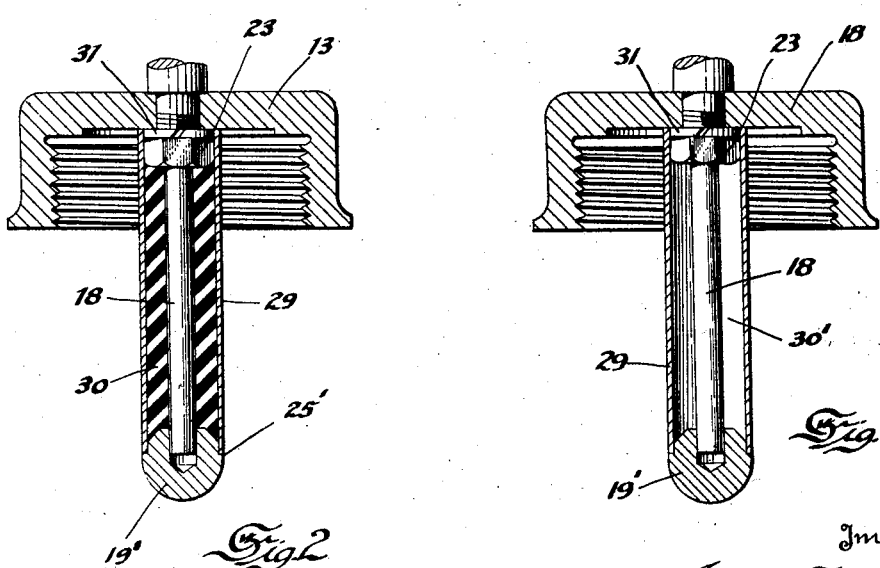
Inventors
Joseph Zubaty &
Louis M. Spencer
By Blackmore, Spencer & Hulh.
Attorneys Patented Dec. 11, 1928.

1,694,871

UNITED STATES PATENT OFFICE.

LOUIS M. SPENCER, OF DETROIT, AND JOSEPH ZUBATY, OF FLINT, MICHIGAN, ASSIGNORS TO A C SPARK PLUG COMPANY, OF FLINT, MICHIGAN, A CORPORATION OF MICHIGAN.

HEAT INDICATOR FOR INTERNAL-COMBUSTION ENGINES.

Application filed July 23, 1927. Serial No. 208,020.

This invention relates to heat indicators particularly to the type of heat indicators applied to the radiators of automotive vehicles.

In the type of indicator disclosed, use is made of a metal conducting or heat transmitting rod which is passed through an opening in the cap of the conventional vehicle radiator. The lower end of the rod is ball shaped and extends below the surface of the water in the usual upper tank of the radiator. This ball shaped end may be formed integral with the rod or it may be a separate sphere or ball united with the rod by welding or any other suitable means.

In the present invention the shank portion of the heat transmitting rod between the ball end and the radiator cap is surrounded by an insulating medium so as to keep the shank portion free from any heating effects of the air in the tank above the water and in this respect is to be distinguished from prior constructions. For the seating of the lower end of this insulating member the ball end has a seat or groove while the upper end of the insulation abuts either directly against the radiator cap or against a nut used to secure the heat transmitting rod to the radiator cap.

Three different species for accomplishing the insulation of the shank portion of the heat transmitting rod are shown on the accompanying drawing in two of which the insulating material is in direct contact with the shank portion while in the third species an air column is used to insulate the rod from the air of the radiator tank.

In prior constructions of this character no insulation has been provided for the exposed portion of the heat transmitting rod. This has resulted in an inaccurate transmission of heat from the water to the means located outside the radiator for indicating the temperature changes. By insulating that portion of the heat transmitting rod surrounded by the air in the upper radiator tank, we are able to secure a substantial complete transmission of the heat from the water to the external temperature change indicator. If the heat transmitting rod is left uncovered, the cooler air will absorb some of the heat and reduce the efficiency of the heat transmission.

The invention is disclosed in the accompanying drawing in which:

Fig. 1 is a section through the radiator cap of an automotive vehicle showing my invention applied thereto.

Fig. 2 is a similar sectional view of a second species.

Fig. 3 is a view similar to Fig. 1 of a third species.

Referring to the numbered parts on the drawing, 10 indicates the radiator of an automotive vehicle. The upper tank of the radiator is indicated at 11, and 13 is the usual radiator cap which closes the opening 14. The tank 11 has the upturned flange 15, to which is secured the threaded collar 16, onto which is screwed the radiator cap 13.

The cap 13 is provided with an opening 17 for the reception of a heat transmitting rod 18, preferably of metal of any suitable kind. To the lower end of the rod 18 there is secured by welding or in any other suitable manner, a ball or sphere 19, which extends below the surface 20 of the water 21 in the tank 11. The upper end of the rod where it extends through the opening 17 is threaded as shown at 22 and has threaded thereon a nut 23 which in cooperation with the shoulder 24 holds the rod 18 in position.

The ball 19 has a seat or shoulder 25 for the reception of the lower end of a shell or column 26 of heat insulating material. This insulating material may be of any suitable kind, but we prefer either asbestos or hard rubber. This insulating material fits closely around the heat transmitting rod 18 and at its upper portion fits tightly against the nut 23 and thus forms an insulation against the effects of heat changes due to the action of the air above the surface 20 of the water 21 in the tank 11. This insulation will assure a more complete and accurate transmission of the heat in the water 21 to the temperature indicating device 27 at the outside exposed end of the rod 18. This temperature indicating device preferably consists of a metallic screen secured to a ring welded to the end 28 of the rod 18 and over which there is placed a coating of heat sensitive paint, the color of which varies with a change in temperature. Any other suitable type of temperature indicator may be used.

Referring to the species of Fig. 2, it will be noted that we use a different form of insulation. The ball shaped end 19' has a seat 25' for the reception of a sleeve or tube 29, preferably of metal, spaced from the rod 18 by means of suitable insulating material 30, preferably asbestos or rubber. At the cap end of the rod 18 we apply a washer 31 between the nut 23 and the radiator cap 13 and around this washer there is secured the upper end of the sleeve or column 29. The insulating material 30 in this species will protect the rod 18 from temperature changes which may be caused by the air in the tank 11.

The species of Fig. 3 is in all respects similar to that of Figure 2 except that in place of the insulating material 30 of Fig. 2, use is made of the air column 30' as the insulator.

We claim:

1. In combination with the radiator of an automotive vehicle, a means for indicating temperature changes in the radiator comprising a rod extending through the cap thereof, an enlarged end on said rod extending below the surface of the water in the radiator, means for insulating the shank portion of said rod, and means at the opposite end of said rod for indicating temperature changes.

2. In combination with the radiator of an automotive vehicle, a heat indicating device comprising a rod extending through the cap thereof, a ball on the rod end, said ball extending below the surface of the water in the radiator, means for insulating the shank portion of said rod from the temperature effects of the air in the radiator, and means on the exposed end of the rod for indicating temperature changes.

3. In combination with the radiator of an automotive vehicle, a heat indicating device comprising a member having an enlarged end and extending through the radiator cap, a seat on said enlarged end, means resting on said seat and extending to the radiator cap to form an insulating medium, and means on the opposite end of said member to indicate temperature changes.

4. In combination with the radiator of an automotive vehicle, a heat indicating device comprising a metal rod extending through the radiator cap, a ball end on said rod extending below the surface of the water in said radiator, an asbestos covering around the shank of said rod, and means at the opposite end of said rod to indicate temperature changes.

5. In combination with the radiator of an automotive vehicle, a heat indicating device including a metal rod extending through the radiator cap, means inside said radiator to secure said rod against said cap, an enlarged end on said rod extending below the surface of the water in said radiator, means extending from said end to said cap and secured to said first mentioned means and forming an insulation for the shank portion of said rod, and means interrelated with said rod to indicate temperature differences.

In testimony whereof we affix our signatures.

LOUIS M. SPENCER.
JOSEPH ZUBATY.